United States Patent Office 3,494,245
Patented Feb. 10, 1970

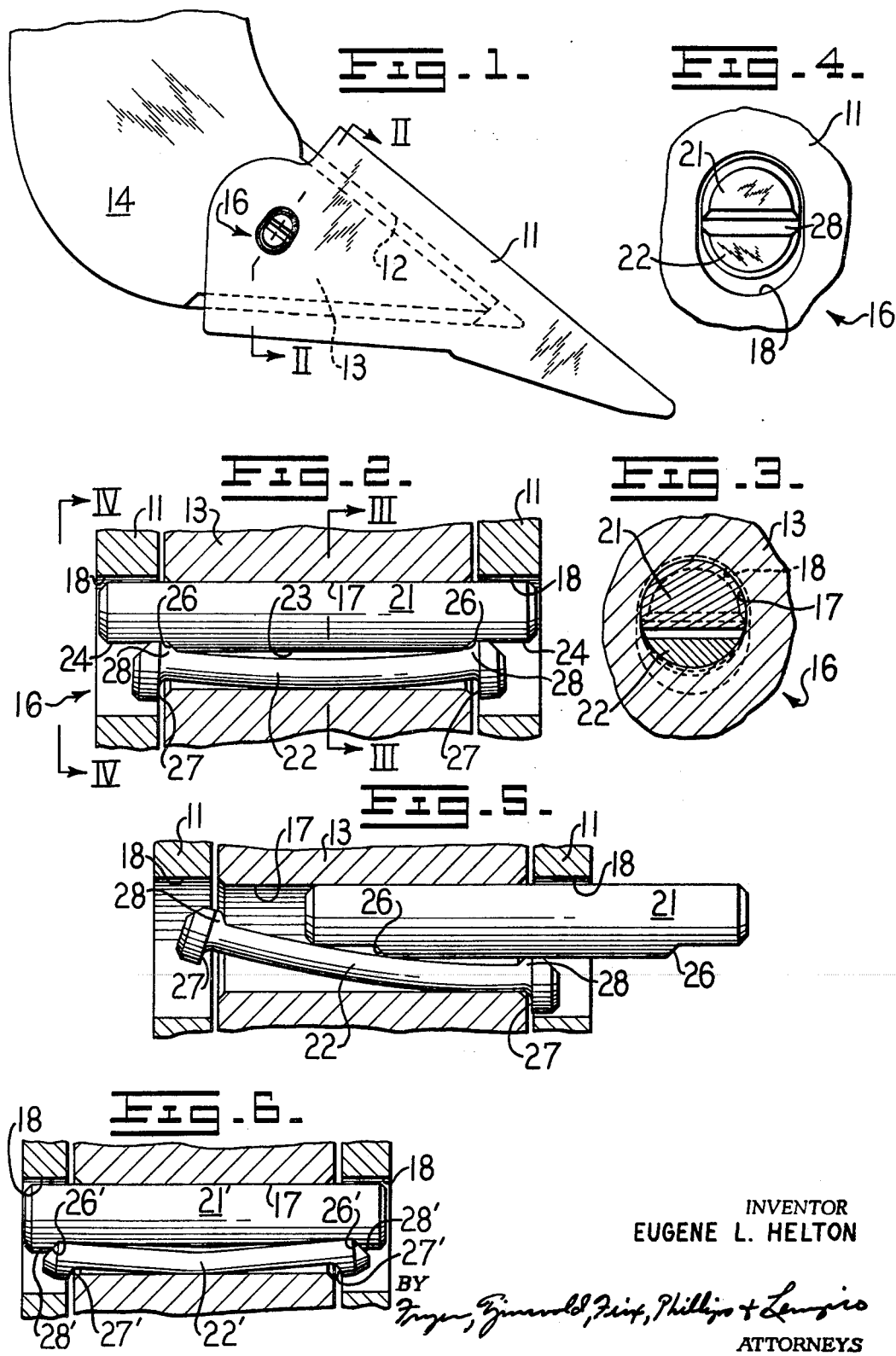

3,494,245
RESILIENTLY INTERACTING RETAINING PIN
Eugene L. Helton, Peoria, Ill., assignor to Caterpillar Tractor Co., Peoria, Ill., a corporation of California
Filed Oct. 14, 1968, Ser. No. 767,248
Int. Cl. E02f 9/28; F16b 19/02, 21/12
U.S. Cl. 85—8.3                                       4 Claims

ABSTRACT OF THE DISCLOSURE

A retaining pin to fit within a bore formed through an earthworking tip and its supporting shank comprising a larger pin portion for resisting shear stresses and a smaller pin portion which is resiliently curved along its length and includes means for interlocking with the larger pin portions and at least one of the bores.

---

The present invention relates to a retaining pin suitable for securing together a pair of telescopic members and more particularly to a retaining pin wherein one of a pair of pin portions is resiliently curved along its length and includes means for interlocking with the other pin portion and with one of the telescopic members.

Numerous examples of retaining pins are known in the prior art. However, none of these designs appear totally satisfactory in view of the very large forces which they must resist without displacement and the further need for easy assembly and disassembly of the retaining pin without damaging it. These retaining pins are commonly employed in earthmoving equipment, for example, to secure ripper tips or bucket tips upon suitable supporting shanks. The retaining pin must not only reliably secure the tip upon its shank, but must additionally resist failure from shear forces which may commonly arise at the ends of the pin. The retaining pin must also permit easy assembly and disassembly of the tip from its shank to permit replacement of the tips in the field.

Accordingly, it is an object of the present invention to provide a retainer pin which firmly secures together a pair of telescoping members and which also facilitates assembly and disassembly of the retaining pin.

It is also an object of the invention to provide a retaining pin which effectively resists shear stresses particularly adjacent its ends. The present invention accomplishes this object through the use of one pin portion having a substantial cross section along its length.

It is a further object of the invention to provide a retaining pin which facilitates disassembly from a suitable bore even in environments where pulverized material tends to be packed around the retaining pin and resist its removal from the bore.

Other objects and advantages of the present invention are made apparent in the following description having reference to the accompanying drawing.

In the drawing:

FIG. 1 is a side view of a ripper tip secured upon a supporting shank by means of a retaining pin;

FIG. 2 is a view taken along section lines II—II of FIG. 1 and illustrating a retaining pin according to the present invention;

FIGS. 3 and 4 are views taken along section lines III—III and IV—IV respectively of FIG. 2;

FIG. 5 is a view similar to FIG. 2 and illustrating the manner of assembly and disassembly for the retaining pin; and FIG. 6 is a view similar to FIG. 2 and illustrates an alternate embodiment of the retaining pin shown in FIG. 2.

Referring to FIG. 1, a wedge-shaped ripper tip 11 having a tapered socket 12 is telescopically mounted on the nose portion 13 of a ripper shank 14. The tip 11 is secured upon the shank 14 by means of a retaining pin indicated at 16. The retaining pin 16 is illustrated in greater detail in FIGS. 2–4. Referring particularly to FIG. 2, the inner telescopic member or shank nose 13 defines a bore 17 while the shank defines a pair of bores 18 which are in axial alignment with each other and in general alignment with the bore 17 when the ripper tip 11 is suitably mounted upon the shank nose 13 (see FIG. 1). The bore 17 is of slightly oval configuration to resist rotation of the retaining pin, as is best seen in FIG. 3. The bores 18 are elongated along the major axis of the oval bore 17 to prevent interference with the retaining pin as will be apparent from the following description of the retaining pin 16. The retaining pin 16 is comprised of two segmented portions 21 and 22 which upon being assembled together within the bores 17 and 18 tend to substantially fill the oval bore 17 and resist accumulation of dirt or other pulverized material within the bore 17 which might otherwise tend to prevent disassembly of the retaining pin 16.

The larger pin portion 21 is segmented along a surface 23 and is generally of cylindrical or oval configuration mate with a substantial portion of the bore 17. The substantial cross section of the pin portion 21 makes it particularly effective for resisting shear stresses. The larger pin portion 21 is recessed at each end of its segmental surface 23, as indicated at 24, to permit interlocking with the smaller pin portion 22. An inclined surface 26 is formed between the segmental surface 23 and each of the recesses 24 to facilitate disassembly of the retaining pin 16.

The smaller segmented pin portion 22 is resiliently curved along its length with its center preferably curving away from the larger pin portion 21 when the retaining pin 16 is assembled in place. An annularly shaped shoulder 27 is formed at each end of the smaller pin portion 22 to effectively overlap the shank nose 13 adjacent its bore 17 when the two pin portions are assembled together in place. A projection 28 is also formed upon each end of the smaller pin portion 22 adjacent the larger pin portion 21 to interlock with the recesses 24 of the larger pin portion when the retaining pin is assembled in place. The retaining pin 16 is disassembled from its position shown in FIG. 2 by driving the larger pin portion 21 in either direction by suitable means such as a punch (not shown). As the larger pin portion 21 is driven in either direction, one of the incline surfaces 26 tends to urge the respective end of the smaller pin portion 22 out of interlocking relation while preventing damage to either of the pin portions so that they may be reused.

The retaining pin 16 is assembled in place within the bores 17 and 18 by first centrally positioning the smaller pin portion 22 within the bore 17 as illustrated in FIG. 5. The larger pin portion 21 is then inserted through one of the bores 18 and an end of the bore 17 so that it passes over one of the end projections 28 on the smaller pin portion 22. Upon driving the larger pin portion 21 further to the left, as seen in FIG. 5, it contacts the leftward end of the smaller pin portion 22 and urges it downwardly until the larger pin portion 21 is centered within the bore 17 and its incline surfaces 26 are in interlocking engagement with the projection 28 on the smaller pin portion. Flexure of the smaller pin portion 22 during insertion of the larger pin portion 21 tends to maintain the projections 28 in engagement with the larger pin portion 21 and to resist loosening of the retaining pin 16 from the bores. However, the retaining pin assembly may be easily disassembled by driving the larger pin portion in either axial direction. One of the incline surfaces 26 then acts against the respective projection 28 urging it downwardly so that the larger pin portion may be removed from the bores in a generally similar manner as described above.

An alternate embodiment of the retaining pin is illustrated in FIG. 6 with construction and manner of assembly and disassembly being generally similar to the embodiment described with reference to FIGS. 2–5. The larger and smaller pin portions are indicated at 21' and 22', respectively. Similar annularly shaped shoulders 27' are formed upon the smaller pin portion 22' for overlapping engagement with the shank nose 13. However, in this embodiment, the ends of the larger pin portion 21' are not segmented as in the above embodiment. Rather, inclined surfaces 26' are formed facing inwardly from the respective ends of the larger pin portion. The tapered ends 28' on the smaller pin portion 22. serve as projections for interlocking with the tapered surfaces 26' when the larger and smaller pin portions 21' and 22' are assembled together within the bores 17 and 18.

What is claimed is:

1. A retaining pin securing together an inner telescopic member and an outer telescopic member the outer member defining a pair of enlarged bores, the inner member defining a smaller bore for axial alignment between the larger bores of the outer member, comprising
a larger generally rigid segmented pin portion and a smaller, generally mating segmented pin portion, the smaller pin portion being resiliently curved along its length and having means defined at each end for releasibly interlocking with the larger pin portion at the ends of its segmental surface and for releasibly interlocking with one of the telescopic members, the interlocking means at each end of the smaller pin portion including a projection for interlocking with a recess in the respective end of the larger pin portion and a projecting shoulder for overlapping the bore of the inner member when the retaining pin is assembled in place, the larger pin portion generally mating with a portion of the smaller bore and defining an inclined surface adjacent the recess at each of its ends, the inclined surfaces facing generally outwardly toward the respective ends of the larger pin portion.

2. The invention of claim 1 wherein the smaller bore is generally oval and the center of the smaller pin portion curves away from the larger pin portion.

3. A retaining pin securing together an inner telescopic member and an outer telescopic member, the outer member defining a pair of enlarged bores, the inner member defining a smaller bore for axial alignment between the larger bores of the outer member, comprising
a larger, generally rigid segmented pin portion and a smaller, generally mating segmented pin portion, the smaller pin portion being resiliently curved along its length and having means defined at each end for releasibly interlocking with the larger pin portion at the ends of its segmental surface and for releasibly interlocking with one of the telescopic members, the interlocking means at each end of the smaller pin portion including a surface for interlocking with a recess in the respective end of the larger pin portion and a projecting shoulder for overlapping the bore of the inner member when the retaining pin is assembled in place, the larger pin portion generally mating with a portion of the smaller bore and defining an inclined surface arranged between each recess and the adjacent end of the larger pin portion, the inclined surface facing generally inwardly to overlap the smaller pin portion.

4. The invention of claim 3 wherein the smaller bore is generally oval and the center of the smaller pin portion curves away from the larger pin portion.

References Cited

UNITED STATES PATENTS

| | | | |
|---|---|---|---|
| 2,772,492 | 12/1956 | Murtaugh | 85—8.3 X |
| 2,901,845 | 9/1959 | Whisler | 85—8.3 X |

RAMON S. BRITTS, Primary Examiner

U.S. Cl. X.R.

37—142